(12) United States Patent
Subramanian et al.

(10) Patent No.: US 11,934,670 B2
(45) Date of Patent: Mar. 19, 2024

(54) PERFORMING VARIOUS OPERATIONS AT THE GRANULARITY OF A CONSISTENCY GROUP WITHIN A CROSS-SITE STORAGE SOLUTION

(71) Applicant: NetApp, Inc., Sunnyvale, CA (US)

(72) Inventors: Murali Subramanian, Karnataka (IN); Akhil Kaushik, Karnataka (IN); Anoop Vijayan, Karnataka (IN); Omprakash Khandelwal, Bangalore (IN); Arun Kumar Selvam, Tamilnadu (IN)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 17/219,759

(22) Filed: Mar. 31, 2021

(65) Prior Publication Data

US 2022/0317897 A1    Oct. 6, 2022

(51) Int. Cl.
   *G06F 3/06*    (2006.01)
(52) U.S. Cl.
   CPC .......... *G06F 3/0631* (2013.01); *G06F 3/0604* (2013.01); *G06F 3/067* (2013.01)
(58) Field of Classification Search
   CPC ....... G06F 3/0631; G06F 3/0604; G06F 3/067
   USPC ......................................................... 711/154
   See application file for complete search history.

(56) References Cited

U.S. PATENT DOCUMENTS

| | | | |
|---|---|---|---|
| 5,742,792 A * | 4/1998 | Yanai | G06F 3/064 714/763 |
| 6,389,551 B1 | 5/2002 | Yount | |
| 6,415,372 B1 | 7/2002 | Zakai et al. | |
| 6,732,124 B1 | 5/2004 | Koseki et al. | |
| 7,039,827 B2 | 5/2006 | Meyer et al. | |
| 7,475,204 B2 | 1/2009 | Buah et al. | |
| 7,500,014 B1 | 3/2009 | Jacobson et al. | |

(Continued)

OTHER PUBLICATIONS

Pan L., "Paxos at its heart is very simple," Distributed System, 2018, Retrieved From : https://blog.the-pans.com/paxos-explained/, pp. 1-12.

(Continued)

*Primary Examiner* — Charles Rones
*Assistant Examiner* — Alexander Vinnitsky
(74) *Attorney, Agent, or Firm* — Jaffery Watson Mendonsa & Hamilton LLP

(57) ABSTRACT

Systems and methods are described for efficiently performing various operations at the granularity of a consistency group (CG) within a cross-site storage solution. An example of one of the various operations includes an independent and parallel resynchronization approach that independently brings individual volumes of a CG to a steady state of in-synchronization (InSync), thereby contributing to scalability of CGs by supporting CGs having a large number of member volumes without requiring a change to the resynchronization process. Another example includes preserving dependent write-order consistency when a remote mirror copy goes out-of-synchronization (OOS) for any reason by driving all member volumes OOS responsive to any member volume becoming OOS. Yet another example includes independent creation of snapshots by member volumes to support efficient and on-demand creation by an application of a common snapshots of all or a subset of peered member volumes of a CG with which the application is associated.

21 Claims, 11 Drawing Sheets

(56) References Cited

U.S. PATENT DOCUMENTS

| | | |
|---|---|---|
| 7,631,066 B1 | 12/2009 | Schatz et al. |
| 7,640,451 B2 | 12/2009 | Meyer et al. |
| 7,644,305 B2 | 1/2010 | Friedrich et al. |
| 7,890,626 B1 | 2/2011 | Gadir |
| 8,498,967 B1 | 7/2013 | Chatterjee et al. |
| 8,645,623 B1 | 2/2014 | O'Shea et al. |
| 8,856,583 B1 | 10/2014 | Visser et al. |
| 8,874,960 B1 | 10/2014 | Khan et al. |
| 9,189,341 B1 | 11/2015 | Natanzon et al. |
| 10,412,066 B1 | 9/2019 | Vemuri |
| 10,489,230 B1 | 11/2019 | Chen et al. |
| 10,496,320 B2 | 12/2019 | Eisler et al. |
| 10,725,691 B1 | 7/2020 | Kaushik et al. |
| 10,761,768 B1 | 9/2020 | Kaushik et al. |
| 11,036,423 B2 | 6/2021 | Kaushik et al. |
| 11,089,105 B1* | 8/2021 | Karumbunathan ..... G06F 3/067 |
| 11,327,857 B2 | 5/2022 | Bhargava et al. |
| 11,360,867 B1 | 6/2022 | Subramanian et al. |
| 11,409,622 B1 | 8/2022 | Kaushik et al. |
| 11,481,139 B1 | 10/2022 | Vijayan et al. |
| 11,537,314 B1 | 12/2022 | Subramanian et al. |
| 11,550,679 B2 | 1/2023 | Kaushik et al. |
| 2002/0132613 A1 | 9/2002 | Leung et al. |
| 2004/0153719 A1 | 8/2004 | Achiwa et al. |
| 2004/0267809 A1 | 12/2004 | East et al. |
| 2005/0229034 A1 | 10/2005 | Fujibayashi |
| 2005/0270855 A1 | 12/2005 | Earhart et al. |
| 2006/0095478 A1 | 5/2006 | Cherkauer et al. |
| 2006/0136354 A1 | 6/2006 | Bell et al. |
| 2006/0236048 A1 | 10/2006 | Deguchi et al. |
| 2007/0016754 A1 | 1/2007 | Testardi |
| 2007/0180307 A1 | 8/2007 | Zohar et al. |
| 2007/0234006 A1 | 10/2007 | Radulescu et al. |
| 2008/0201702 A1 | 8/2008 | Bunn |
| 2009/0043979 A1 | 2/2009 | Jarvis |
| 2009/0089609 A1 | 4/2009 | Baba |
| 2009/0307530 A1 | 12/2009 | Tarta |
| 2010/0064168 A1 | 3/2010 | Smoot et al. |
| 2010/0082962 A1 | 4/2010 | Srinivasan et al. |
| 2010/0161554 A1 | 6/2010 | Datuashvili et al. |
| 2011/0106855 A1 | 5/2011 | Resch et al. |
| 2011/0314148 A1 | 12/2011 | Petersen et al. |
| 2012/0151249 A1 | 6/2012 | Swan et al. |
| 2013/0159620 A1 | 6/2013 | Sakashita et al. |
| 2014/0298136 A1 | 10/2014 | Resch et al. |
| 2015/0006949 A1 | 1/2015 | Bittles et al. |
| 2015/0058838 A1 | 2/2015 | Tsirkin |
| 2015/0378767 A1 | 12/2015 | Tarasuk-Levin et al. |
| 2016/0063083 A1 | 3/2016 | Mu et al. |
| 2016/0366226 A1 | 12/2016 | Friedman et al. |
| 2017/0093983 A1 | 3/2017 | Everhart et al. |
| 2018/0260125 A1 | 9/2018 | Botes et al. |
| 2018/0352032 A1 | 12/2018 | Liu et al. |
| 2019/0004908 A1 | 1/2019 | Gopinath et al. |
| 2019/0034286 A1* | 1/2019 | Brown ................ G06F 11/1451 |
| 2019/0212924 A1 | 7/2019 | Ward et al. |
| 2019/0229978 A1 | 7/2019 | Rajvaidya et al. |
| 2019/0347352 A1 | 11/2019 | Gochkov et al. |
| 2019/0394266 A1 | 12/2019 | Fukuyama et al. |
| 2020/0027898 A1 | 1/2020 | Paul et al. |
| 2020/0034258 A1 | 1/2020 | Avraham et al. |
| 2020/0035627 A1 | 1/2020 | Iguchi et al. |
| 2020/0050495 A1 | 2/2020 | Voutilainen et al. |
| 2020/0050587 A1 | 2/2020 | Kaushik et al. |
| 2020/0081801 A1 | 3/2020 | Brown et al. |
| 2020/0125460 A1 | 4/2020 | Selvaraj et al. |
| 2020/0133520 A1 | 4/2020 | Patnaik et al. |
| 2020/0273984 A1 | 8/2020 | Nakano et al. |
| 2020/0278984 A1 | 9/2020 | Kaushik et al. |
| 2020/0319982 A1 | 10/2020 | Rusev et al. |
| 2020/0356274 A1 | 11/2020 | Kaushik et al. |
| 2021/0303165 A1 | 9/2021 | Kaushik et al. |
| 2021/0374157 A1 | 12/2021 | Reddy et al. |
| 2022/0019350 A1* | 1/2022 | Karr ..................... G06F 16/275 |
| 2022/0121533 A1* | 4/2022 | Kumar ................ G06F 11/1464 |
| 2022/0317896 A1 | 10/2022 | Valan et al. |
| 2022/0318104 A1 | 10/2022 | Bhargava et al. |
| 2022/0318105 A1 | 10/2022 | Subramanian et al. |
| 2022/0357854 A1 | 11/2022 | Narasingarayanapeta |
| 2022/0357855 A1 | 11/2022 | Narasingarayanapeta |
| 2022/0374321 A1 | 11/2022 | Kaushik et al. |
| 2023/0110776 A1 | 4/2023 | Subramanian et al. |
| 2023/0119175 A1 | 4/2023 | Kaushik et al. |
| 2023/0121272 A1 | 4/2023 | Subramanian et al. |
| 2023/0161495 A1 | 5/2023 | Narasingarayanapeta |
| 2023/0168834 A1 | 6/2023 | Narasingarayanapeta |
| 2023/0289076 A1 | 9/2023 | Subramanian et al. |

OTHER PUBLICATIONS

Co-pending U.S. Appl. No. 17/861,768, inventor Narasingarayanapeta; Krishna Murthy Chandraiah Setty, filed Jul. 11, 2022.

Co-pending U.S. Appl. No. 17/970,961, inventor Vijayan; Anoop, filed Oct. 21, 2022.

Non-Final Office Action dated Jan. 17, 2023 for U.S. Appl. No. 17/881,381, filed Aug. 4, 2022, 18 pages.

Non-Final Office Action dated Apr. 13, 2023 for U.S. Appl. No. 18/066,775, filed Dec. 15, 2022, 16 pages.

Non-Final Office Action dated Mar. 16, 2023 for U.S. Appl. No. 17/970,961, filed Oct. 21, 2022, 6 pages.

Notice of Allowance dated Dec. 13, 2022 for U.S. Appl. No. 17/219,815, filed Mar. 31, 2021.

Notice of Allowance dated Nov. 18, 2022 for U.S. Appl. No. 17/219,812, filed Mar. 31, 2021, 12 pages.

Notice of Allowance dated Oct. 31, 2022 for U.S. Appl. No. 17/219,812, filed Mar. 31, 2021, 9 pages.

Notice of Allowance dated Apr. 7, 2023 for U.S. Appl. No. 17/219,740, filed Mar. 31, 2021, 7 pages.

Notice of Allowance dated Mar. 3, 2023 for U.S. Appl. No. 17/219,815, filed Mar. 31, 2021, 5 pages.

Notice of Allowance dated Mar. 20, 2023 for U.S. Appl. No. 17/219,740, filed Mar. 31, 2021, 11 pages.

U.S. Non-Final Office action dated Dec. 21, 2021 in U.S. Appl. No. 17/238,829.

U.S. Notice of Allowance dated Apr. 6, 2022 in U.S. Appl. No. 17/238,829.

U.S. Notice of Allowance dated Jun. 23, 2022 in U.S. Appl. No. 17/219,746.

U.S. Notice of Allowance dated Jun. 24, 2022 in U.S. Appl. No. 17/219,816.

U.S. Notice of Allowance dated Oct. 26, 2022 in U.S. Appl. No. 17/219,812, 9 pages.

Non-Final Office Action dated Feb. 17, 2023 for U.S. Appl. No. 17/510,795, filed Oct. 26, 2021, 11 pages.

Notice of Allowance dated Nov. 2, 2022 for U.S. Appl. No. 17/495,990, filed Oct. 7, 2021, 8 pages.

Notice of Allowance dated Jun. 14, 2023 for U.S. Appl. No. 17/505,962, filed Oct. 20, 2021, 8 pages.

Notice of Allowance dated Sep. 20, 2023 for U.S. Appl. No. 17/505,962, filed Oct. 20, 2021, 8 pages.

* cited by examiner

PERFORMING VARIOUS OPERATIONS AT THE GRANULARITY OF A CONSISTENCY GROUP WITHIN A CROSS-SITE STORAGE SOLUTION

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2021, NetApp, Inc.

BACKGROUND

Field

Various embodiments of the present disclosure generally relate to multi-site distributed data storage systems. In particular, some embodiments relate to performing various operations at the granularity of a consistency group within cross-site storage solutions (e.g., cross-site high-availability (HA) storage solutions and cross-site asynchronous disaster recovery (DR) solutions).

Description of the Related Art

Multiple storage nodes organized as a cluster may provide a distributed storage architecture configured to service storage requests issued by one or more clients of the cluster. The storage requests are directed to data stored on storage devices coupled to one or more of the storage nodes of the cluster. The data served by the storage nodes may be distributed across multiple storage units embodied as persistent storage devices, such as hard disk drives (HDDs), solid state drives (SSDs), flash memory systems, or other storage devices. The storage nodes may logically organize the data stored on the devices as volumes accessible as logical units. Each volume may be implemented as a set of data structures, such as data blocks that store data for the volume and metadata blocks that describe the data of the volume.

For various use cases, for example, involving data protection and data migration, it is desirable to efficiently and effectively manage a unit of storage objects/volumes as a single unit.

SUMMARY

Systems and methods are described for efficiently performing various operations at the granularity of a consistency group within a cross-site storage solution. According to one embodiment, a distributed storage system brings individual volumes of a local consistency group into an in-synchronization (InSync) state. State information regarding a data replication status of a mirror copy of a dataset associated with the local consistency group is maintained by the distributed storage system. The distributed storage system includes multiple volumes that are members of the local consistency group and the mirror copy is stored on corresponding volumes that are members of a remote consistency group of a remote distributed storage system. A baseline snapshot of the dataset is created a dependent write-order consistent manner responsive to a predetermined event, after a period of time during which the state information indicated each volume of each volume pair of the volumes of the local consistency group and the corresponding volumes of the remote consistency group was in an out-of-synchronization (OOS) state. The baseline snapshot is transferred to the remote distributed storage system. Then, the mirror copy is brought into the InSync state by orchestrating, independently and in parallel, a resynchronization of each volume pair of the volumes of the local consistency group and the corresponding volumes of the remote consistency group.

According to another embodiment, a distributed storage system preserves dependent write-order consistency on a mirror copy by taking all members OOS when any member becomes OOS. A first volume of multiple volumes that are members of a local consistency group of the distributed storage system is detected to be in the OOS state with respect to the mirror copy of a dataset associated with the local consistency group that is maintained on corresponding volumes that are members of a remote consistency group of a remote distributed storage system. Access to data stored on the first volume is temporarily disallowed. A consensus protocol request is broadcast, on behalf of the first volume, to the local consistency group. Responsive to receipt of a first phase communication associated with the consensus protocol request directed to a given volume: (i) access to data stored on the given volume is temporarily disallowed, (ii) the first phase communication is acknowledged, and (iii) responsive to receipt of a second phase communication associated with the consensus protocol request directed to a particular volume, the particular volume is placed in in the OOS state and access to the data stored on the particular volume is permitted.

In yet another embodiment, a distributed storage system facilitates creation of a common write-order consistent snapshot between a local consistency group and a remote consistency group. The distributed storage system receives a request to create a common snapshot between a local consistency group including multiple volumes hosted by the distributed storage system and a remote consistency group on a remote distributed storage system that is protecting the local consistency group. A first consensus protocol request is sent on behalf of a first volume of the multiple volumes to the local consistency group. Responsive to receipt, on behalf of a given volume of the multiple volumes, of the first consensus protocol request: (i) access to data stored on the given volume is temporarily disallowed, (ii) independently and in parallel, a first snapshot of the data stored on the given volume and a second snapshot of data stored on the corresponding volume of the remote consistency group are caused be created in a dependent write-order consistent manner, and (iii) a response is sent to the first volume after the first snapshot and the second snapshot have been created, sending a response to the first volume. Responsive to receipt, on behalf of the first volume, of responses from all of the volumes, each of the volumes are caused to start allowing access to their respective data by sending a second consensus protocol request to the local consistency group.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
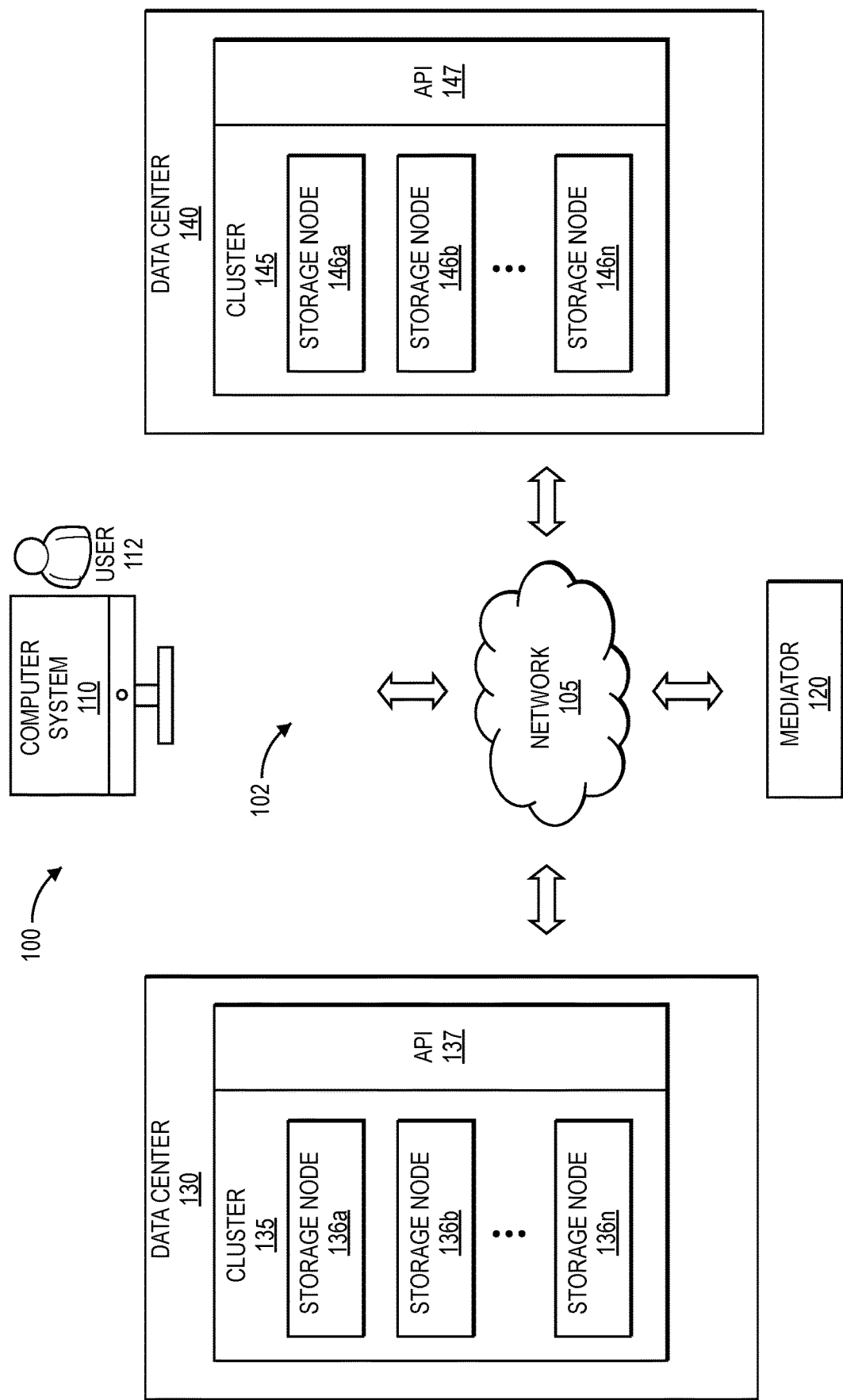
FIG. 1 is a block diagram illustrating an environment in which various embodiments may be implemented.

Systems and methods are described for efficiently performing various operations at the granularity of a consistency group within a cross-site storage solution. In the context of cross-site storage solutions (including cross-site HA storage solutions that perform synchronous data replication to support zero recovery time objective (RTO) protection and cross-site asynchronous DR solutions), a certain degree of consistency over time is maintained between a mirror copy and a primary dataset depending upon the particular implementation. Certain operations on a set of data containers/volumes (referred to herein as a consistency group (CG)) hosting the data at issue should be managed as a single unit. Additionally, as a CG is a distributed object, a coordinated process should be used to ensure dependent write-order consistency of the mirror copy. For example, responsive to any member volume of a CG becoming out-of-synchronization (OOS) with respect to a peered volume, in one embodiment, the CG as a whole should be taken OOS to preserve dependent write-order consistency of the mirror copy.

Various use cases, including asynchronous protection, synchronous protection, and planned migration may benefit from the use of CGs. For example, in support of asynchronous protection, a dataset associated with one or more volumes that are members of a local CG of a primary distributed storage system may be periodically transferred to a mirror copy associated with a remote CG of the secondary distributed storage system. This periodic transfer should provide a consistent image of the dataset across all members of a CG and should be transferred in an atomic fashion (all or nothing). In the meantime, the mirror copy may expose a view from the last known CG consistent point (e.g., from the last transfer, such as a baseline snapshot).

With respect to synchronous protection, the mirror copy should always be consistent with the dataset. As a result, any failures associated with synchronous replication should be handled in such a manner that the mirror copy remains consistent. Also, in order to support recovery from, among other potential disruptive events, manual planned disruptive events (e.g., balancing of CG members across a cluster) a resynchronization process should be provided to promptly bring the CG back into a steady state of in-synchronization (InSync) from an OOS state; and ideally a failure of any particular member volume of a CG to achieve the steady state of InSync during any particular attempt of the resynchronization process will not affect the ability on the part of other member volumes to come to the steady state of InSync. Finally, in support of snapshot replication for synchronous protection and to facilitate on-demand creation of snapshots by an application associated with a CG, an efficient process for creating a common snapshot of all or a subset of the peered member volumes of the CG at both a local and a remote location should be provided.

Embodiments described herein seek to improve various technological processes associated with cross-site storage solutions and ensure the process of reinstating a mediator to the role of an arbitrator does not cause correctness issues. Various embodiments of the present technology provide for a wide range of technical effects, advantages, and/or improvements to stretched storage systems and participating distributed storage systems. For example, various embodiments may include one or more of the following technical effects, advantages, and/or improvements: (i) independently bringing individual volumes of a CG to a steady state (InSync); (ii) preserving dependent write-order consistency when a remote mirror copy goes OOS for any reason (e.g., a network failure) by driving all member volumes OOS responsive to any member volume becoming OOS; and (iii) independent creation of snapshots by member volumes to support taking of a common snapshot. One or more of which may include various additional optimizations described further below.

While some embodiments of the present disclosure are described herein with reference to particular usage scenarios in the context of cross-site HA storage solutions, it is to be noted that various embodiments of the present disclosure are applicable to various use cases that arise in the context of cross-cite storage solutions more generally, including cross-site asynchronous DR solutions.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Terminology

Brief definitions of terms used throughout this application are given below.

A "computer" or "computer system" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" or "a computer system" herein may mean one or more computers, unless expressly stated otherwise.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

Example Operating Environment

FIG. 1 is a block diagram illustrating an environment 100 in which various embodiments may be implemented. In various examples described herein, an administrator (e.g., user 112) of a multi-site distributed storage system 102 having clusters 135 and cluster 145 or a managed service provider responsible for multiple distributed storage systems of the same or multiple customers may monitor various operations and network conditions of the distributed storage system or multiple distributed storage systems via a browser-based interface presented on computer system 110.

In the context of the present example, the multi-site distributed storage system 102 includes a data center 130, a data center 140, and optionally a mediator 120. The data centers 130 and 140, the mediator 120, and the computer system 110 are coupled in communication via a network 105, which, depending upon the particular implementation, may be a Local Area Network (LAN), a Wide Area Network (WAN), or the Internet.

The data centers 130 and 140 may represent an enterprise data center (e.g., an on-premises customer data center) that is owned and operated by a company or the data center 130 may be managed by a third party (or a managed service provider) on behalf of the company, which may lease the equipment and infrastructure. Alternatively, the data centers 130 and 140 may represent a colocation data center in which a company rents space of a facility owned by others and located off the company premises. The data centers are shown with a cluster (e.g., cluster 135, cluster 145). Those of ordinary skill in the art will appreciate additional IT infrastructure may be included within the data centers 130 and 140. In one example, the data center 140 is a mirrored copy of the data center 130 to provide non-disruptive operations at all times even in the presence of failures including, but not limited to, network disconnection between the data centers 130 and 140 and the mediator 120, which can also be located at a data center.

Turning now to the cluster 135, it includes multiple storage nodes 136a-n and an Application Programming Interface (API) 137. In the context of the present example, the multiple storage nodes 136a-n are organized as a cluster and provide a distributed storage architecture to service storage requests issued by one or more clients (not shown) of the cluster. The data served by the storage nodes 136a-n may be distributed across multiple storage units embodied as persistent storage devices, including but not limited to HDDs, SSDs, flash memory systems, or other storage devices. In a similar manner, cluster 145 includes multiple storage nodes 146a-n and an Application Programming Interface (API) 147. In the context of the present example, the multiple storage nodes 146a-n are organized as a cluster and provide a distributed storage architecture to service storage requests issued by one or more clients of the cluster.

The API 137 may provide an interface through which the cluster 135 is configured and/or queried by external actors (e.g., the computer system 110, data center 140, the mediator 120, clients). Depending upon the particular implementation, the API 137 may represent a Representational State Transfer (REST)ful API that uses Hypertext Transfer Protocol (HTTP) methods (e.g., GET, POST, PATCH, DELETE, and OPTIONS) to indicate its actions. Depending upon the particular embodiment, the API 137 may provide access to various telemetry data (e.g., performance, configuration, storage efficiency metrics, and other system data) relating to the cluster 135 or components thereof. As those skilled in the art will appreciate various other types of telemetry data may be made available via the API 137, including, but not limited to measures of latency, utilization, and/or performance at various levels (e.g., the cluster level, the storage node level, or the storage node component level).

In the context of the present example, the mediator 120, which may represent a private or public cloud accessible (e.g., via a web portal) to an administrator associated with a managed service provider and/or administrators of one or more customers of the managed service provider, includes a cloud-based, monitoring system.

While for sake of brevity, only two data centers are shown in the context of the present example, it is to be appreciated that additional clusters owned by or leased by the same or different companies (data storage subscribers/customers) may be monitored and one or more metrics may be estimated based on data stored within a given level of a data store in accordance with the methodologies described herein and such clusters may reside in multiple data centers of different types (e.g., enterprise data centers, managed services data centers, or colocation data centers).

Figure 2:
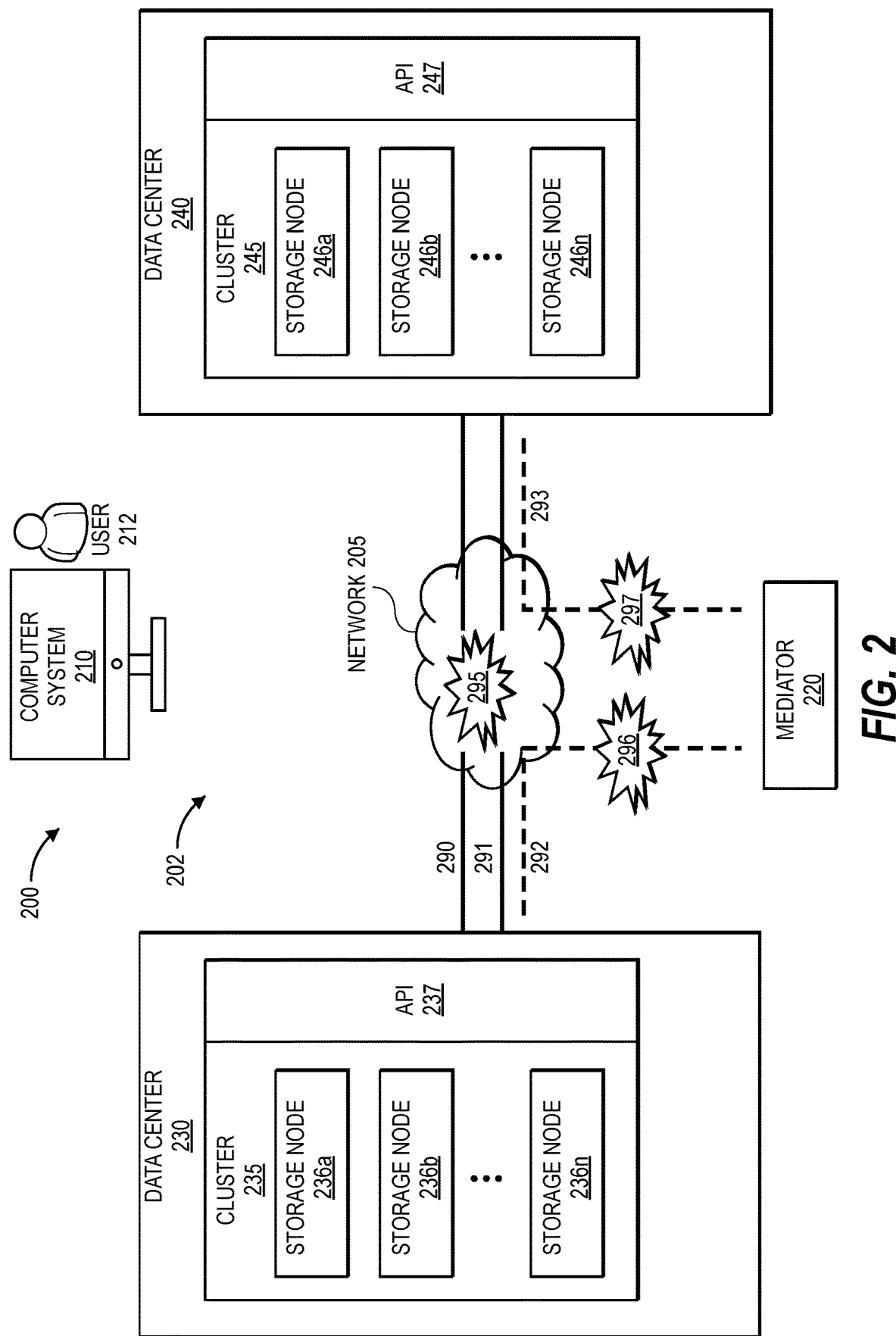
FIG. 2 is a block diagram illustrating an environment having potential failures within a multi-site distributed storage system in which various embodiments may be implemented.

FIG. 2 is a block diagram illustrating an environment 200 having potential failures within a multi-site distributed storage system 202 in which various embodiments may be implemented. In various examples described herein, an administrator (e.g., user 212) of a multi-site distributed storage system 202 having clusters 235 and cluster 245 or a managed service provider responsible for multiple distributed storage systems of the same or multiple customers may monitor various operations and network conditions of the distributed storage system or multiple distributed storage systems via a browser-based interface presented on computer system 210.

In the context of the present example, the system 202 includes data center 230, data center 240, and optionally a mediator 220. The data centers 230 and 240, the mediator 220, and the computer system 210 are coupled in communication via a network 205, which, depending upon the particular implementation, may be a Local Area Network (LAN), a Wide Area Network (WAN), or the Internet.

The data centers 230 and 240 may represent an enterprise data center (e.g., an on-premises customer data center) that is owned and operated by a company or the data center 230 may be managed by a third party (or a managed service provider) on behalf of the company, which may lease the equipment and infrastructure. Alternatively, the data centers 230 and 240 may represent a colocation data center in which a company rents space of a facility owned by others and located off the company premises. The data centers are shown with a cluster (e.g., cluster 235, cluster 245). Those of ordinary skill in the art will appreciate additional IT infrastructure may be included within the data centers 230 and 240. In one example, the data center 240 is a mirrored copy of the data center 230 to provide non-disruptive operations at all times even in the presence of failures including, but not limited to, network disconnection between the data centers 230 and 240 and the mediator 220, which can also be a data center.

The system 202 can utilize communications 290 and 291 to synchronize a mirrored copy of data of the data center 240 with a primary copy of the data of the data center 230. Either of the communications 290 and 291 between the data centers 230 and 240 may have a failure 295. In a similar manner, a communication 292 between data center 230 and mediator 220 may have a failure 296 while a communication 293 between the data center 240 and the mediator 220 may have a failure 297. If not responded to appropriately, these failures whether transient or permanent have the potential to disrupt operations for users of the distributed storage system 202. In one example, communications between the data centers 230 and 240 have approximately a 5-20 millisecond round trip time.

Turning now to the cluster 235, it includes at least two storage nodes 236*a-b*, optionally includes additional storage nodes (e.g., 236*n*) and an Application Programming Interface (API) 237. In the context of the present example, the multiple storage nodes are organized as a cluster and provide a distributed storage architecture to service storage requests issued by one or more clients of the cluster. The data served by the storage nodes may be distributed across multiple storage units embodied as persistent storage devices, including but not limited to HDDs, SSDs, flash memory systems, or other storage devices.

Turning now to the cluster 245, it includes at least two storage nodes 246*a-b*, optionally includes additional storage nodes (e.g., 246*n*) and includes an Application Programming Interface (API) 247. In the context of the present example, the multiple storage nodes are organized as a cluster and provide a distributed storage architecture to service storage requests issued by one or more clients of the cluster. The data served by the storage nodes may be distributed across multiple storage units embodied as persistent storage devices, including but not limited to HDDs, SSDs, flash memory systems, or other storage devices.

In one example, each cluster can have up to 5 CGs with each CG having up to 12 volumes. The system 202 provides a planned failover feature at a CG granularity. The planned failover feature allows switching storage access from a primary copy of the data center 230 to a mirror copy of the data center 240 or vice versa.

Figure 3:
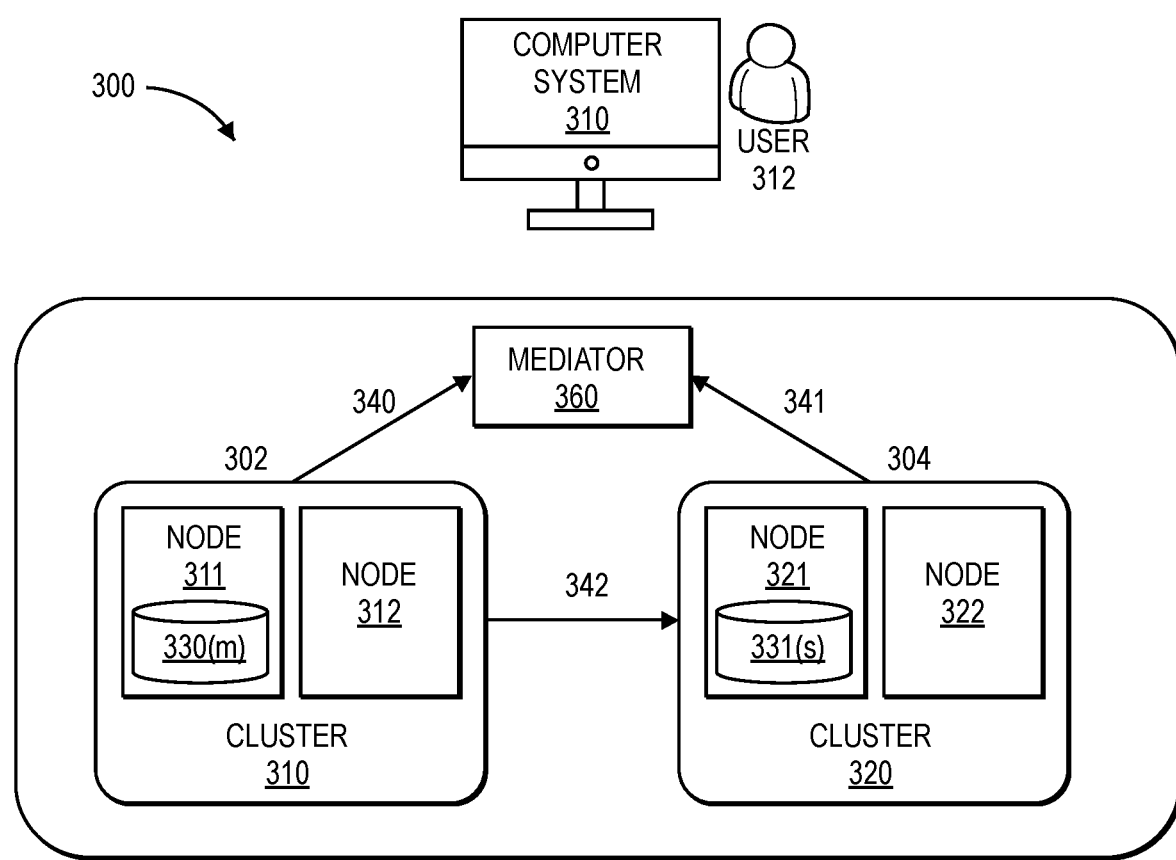
FIG. 3 is a block diagram of a multi-site distributed storage system according to various embodiments of the present disclosure.

FIG. 3 is a block diagram illustrating a multi-site distributed storage system 300 in which various embodiments may be implemented. In various examples described herein, an administrator (e.g., user 312) of the multi-site distributed storage system 302 or a managed service provider responsible for multiple distributed storage systems of the same or multiple customers may monitor various operations and network conditions of the distributed storage system or multiple distributed storage systems via a browser-based interface presented on computer system 310. In the context of the present example, the distributed storage system 300 includes a data center 302 having a cluster 310, a data center 304 having a cluster 320, and a mediator 360. The clusters 310, 320, and the mediator 360 are coupled in communication (e.g., communications 340-342) via a network, which, depending upon the particular implementation, may be a Local Area Network (LAN), a Wide Area Network (WAN), or the Internet.

The cluster 310 includes nodes 311 and 312 while the cluster 320 includes nodes 321 and 322. In one example, the cluster 320 has a data copy 331 that is a mirrored copy of the data copy 330 to provide non-disruptive operations at all times even in the presence of failures including, but not limited to, network disconnection between the data centers 302 and 304 and the mediator 360.

The multi-site distributed storage system 300 provides correctness of data, availability, and redundancy of data. In one example, the node 311 is designated as a master and the node 321 is designated as a slave. The master is given preference to serve I/O commands to requesting clients and this allows the master to obtain a consensus in a case of a race between the clusters 310 and 320. The mediator 360 enables an automated unplanned failover (AUFO) in the event of a failure. The data copy 330 (master), data copy 331 (slave), and the mediator 360 form a three way quorum. If two of the three entities reach an agreement for whether the master or slave should serve I/O commands to requesting clients, then this forms a strong consensus.

The master and slave roles for the clusters 310 and 320 help to avoid a split-brain situation with both of the clusters simultaneously attempting to serve I/O commands There are scenarios where both master and slave copies can claim to be a master copy. For example, a recovery post failover or failure during planned failover workflow can results in both clusters 310 and 320 attempting to serve I/O commands In one example, a slave cannot serve I/O until an AUFO happens. A master doesn't serve I/O commands until the master obtains a consensus.

The multi-site distributed storage system 300 presents a single virtual logical unit number (LUN) to a host computer or client using a synchronized-replicated distributed copies of a LUN. A LUN is a unique identifier for designating an individual or collection of physical or virtual storage devices that execute input/output (I/O) commands with a host computer, as defined by the Small System Computer Interface (SCSI) standard. In one example, active or passive access to this virtual LUN causes read and write commands to be serviced only by node 311 (master) while operations received by the node 321 (slave) are proxied to node 311.

Example Storage Node

Figure 4:
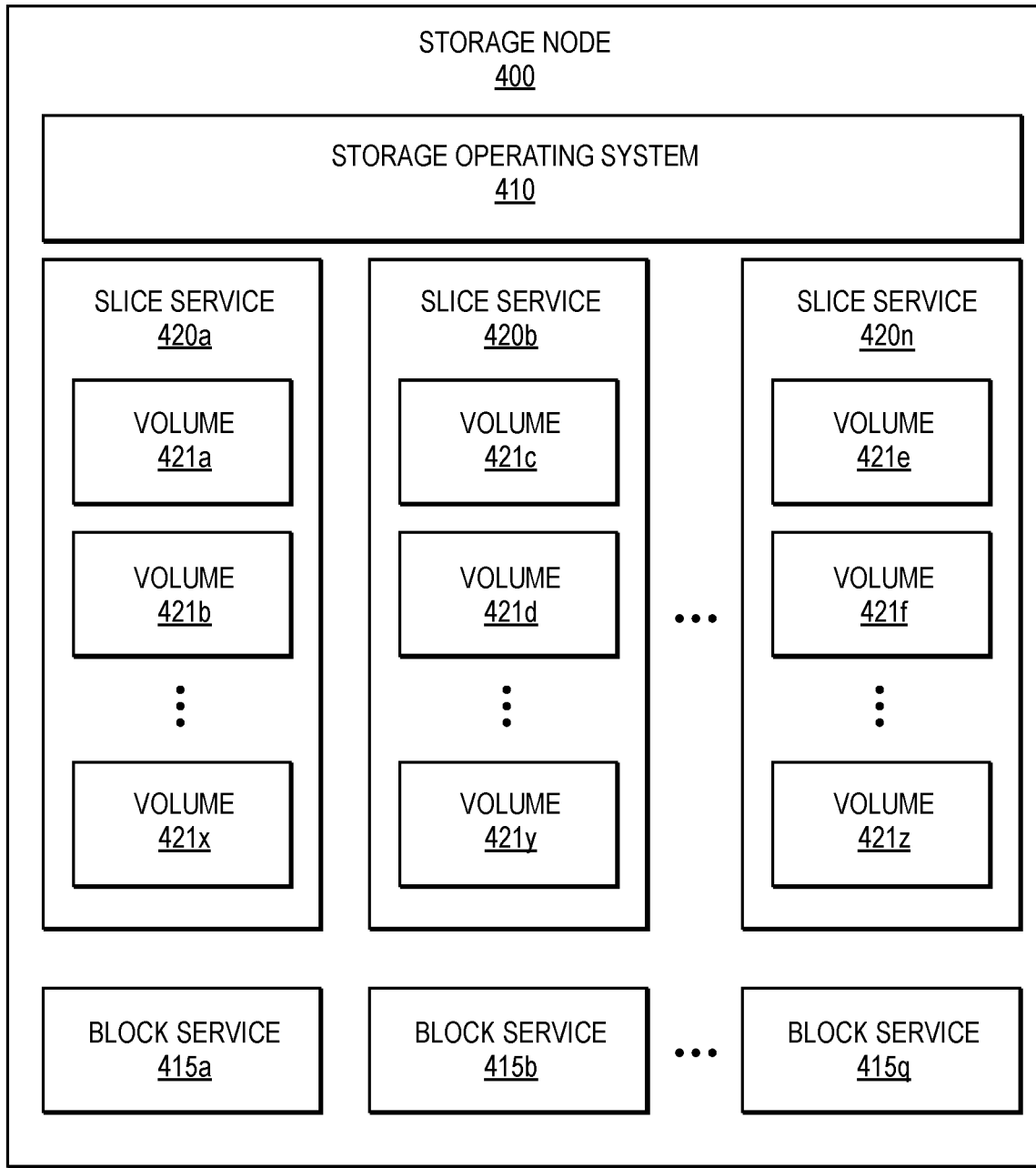
FIG. 4 is a block diagram illustrating a storage node in accordance with an embodiment of the present disclosure.

FIG. 4 is a block diagram illustrating a storage node 400 in accordance with an embodiment of the present disclosure. Storage node 400 represents a non-limiting example of storage nodes (e.g., 136*a-n*, 146*a-n*, 236*a-n*, 246*a-n*, 311, 312, 331, 322, 712, 714, 752, 754) described herein. In the context of the present example, storage node 400 includes a storage operating system 410, one or more slice services 420a-n, and one or more block services 415a-q. The storage operating system (OS) 410 may provide access to data stored by the storage node 400 via various protocols (e.g., small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol. A non-limiting example of the storage OS 410 is NetApp Element Software (e.g., the SolidFire Element OS) based on Linux and designed for SSDs and scale-out architecture with the ability to expand up to 100 storage nodes.

Each slice service 420 may include one or more volumes (e.g., volumes 421a-x, volumes 421c-y, and volumes 421e-z). Client systems (not shown) associated with an enterprise may store data to one or more volumes, retrieve data from one or more volumes, and/or modify data stored on one or more volumes.

The slice services 420a-n and/or the client system may break data into data blocks. Block services 415a-q and slice services 420a-n may maintain mappings between an address of the client system and the eventual physical location of the data block in respective storage media of the storage node 400. In one embodiment, volumes 421 include unique and uniformly random identifiers to facilitate even distribution of a volume's data throughout a cluster (e.g., cluster 135). The slice services 420a-n may store metadata that maps between client systems and block services 415. For example, slice services 420 may map between the client addressing used by the client systems (e.g., file names, object names, block numbers, etc. such as Logical Block Addresses (LBAs)) and block layer addressing (e.g., block IDs) used in block services 415. Further, block services 415 may map between the block layer addressing (e.g., block identifiers) and the physical location of the data block on one or more storage devices. The blocks may be organized within bins maintained by the block services 415 for storage on physical storage devices (e.g., SSDs).

As noted above, a bin may be derived from the block ID for storage of a corresponding data block by extracting a predefined number of bits from the block identifiers. In some embodiments, the bin may be divided into buckets or "sublists" by extending the predefined number of bits extracted from the block identifier. A bin identifier may be used to identify a bin within the system. The bin identifier may also be used to identify a particular block service 415a-q and associated storage device (e.g., SSD). A sublist identifier may identify a sublist with the bin, which may be used to facilitate network transfer (or syncing) of data among block services in the event of a failure or crash of the storage node 400. Accordingly, a client can access data using a client address, which is eventually translated into the corresponding unique identifiers that reference the client's data at the storage node 400.

For each volume 421 hosted by a slice service 420, a list of block IDs may be stored with one block ID for each logical block on the volume. Each volume may be replicated between one or more slice services 420 and/or storage nodes 400, and the slice services for each volume may be synchronized between each of the slice services hosting that volume. Accordingly, failover protection may be provided in case a slice service 420 fails, such that access to each volume may continue during the failure condition.

Consistency Groups

Figure 5:
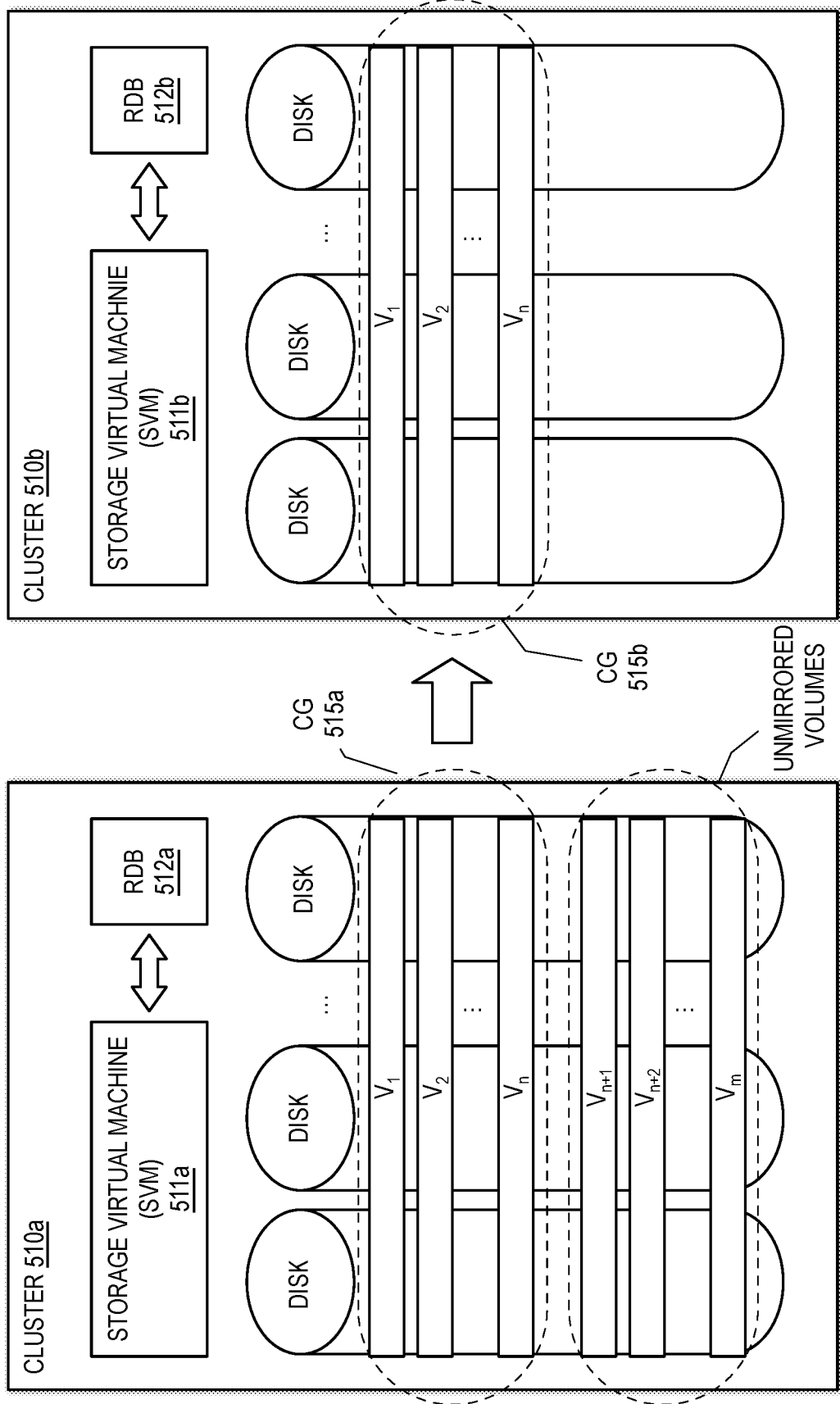
FIG. 5 is a block diagram illustrating the concept of a consistency group (CG) in accordance with an embodiment of the present disclosure.

FIG. 5 is a block diagram illustrating the concept of a consistency group (CG) in accordance with an embodiment of the present disclosure. In the context of the present example, a stretch cluster including two clusters (e.g., cluster 510a and 510b, which may be analogous to cluster 110a and 110b, respectively) is shown. The clusters may be part of a cross-site high-availability (HA) solution that supports zero recovery point objective (RPO) and zero recovery time objective (RTO) protections by, among other things, providing a mirror copy of a dataset at a remote location, which is typically in a different fault domain than the location at which the dataset is hosted. For example, cluster 510a may be operable within a first site (e.g., a local data center) and cluster 510b may be operable within a second site (e.g., a remote data center) so as to provide non-disruptive operations even if, for example, an entire data center becomes non-functional, by seamlessly failing over the storage access to the mirror copy hosted in the other data center.

According to some embodiments, various operations (e.g., data replication, data migration, data protection, failover, and the like) may be performed at the level of granularity of a CG (e.g., CG 515a or CG 515b). A CG is a collection of storage objects or data containers (e.g., volumes) within a cluster that are managed by a Storage Virtual Machine (e.g., SVM 511a or SVM 511b) as a single unit. In various embodiments, the use of a CG as a unit of data replication guarantees a dependent write-order consistent view of the dataset and the mirror copy to support zero RPO and zero RTO. CGs may also be configured for use in connection with taking simultaneous snapshot images of multiple volumes, for example, to provide crash-consistent copies of a dataset associated with the volumes at a particular point in time. The level of granularity of operations supported by a CG is useful for various types of applications. As a non-limiting example, consider an application, such as a database application, that makes use of multiple volumes, including maintaining logs on one volume and the database on another volume.

The volumes of a CG may span multiple disks (e.g., electromechanical disks and/or SSDs) of one or more storage nodes of the cluster. A CG may include a subset or all volumes of one or more storage nodes. In one example, a CG includes a subset of volumes of a first storage node and a subset of volumes of a second storage node. In another example, a CG includes a subset of volumes of a first storage node, a subset of volumes of a second storage node, and a subset of volumes of a third storage node. A CG may be referred to as a local CG or a remote CG depending upon the perspective of a particular cluster. For example, CG 515a may be referred to as a local CG from the perspective of cluster 510a and as a remote CG from the perspective of cluster 510b. Similarly, CG 515a may be referred to as a remote CG from the perspective of cluster 510b and as a local CG from the perspective of cluster 510a. At times, the volumes of a CG may be collectively referred to herein as members of the CG and may be individually referred to as a member of the CG. In one embodiment, members may be added or removed from a CG after it has been created.

A cluster may include one or more SVMs, each of which may contain data volumes and one or more logical interfaces (LIFs) (not shown) through which they serve data to clients. SVMs may be used to securely isolate the shared virtualized data storage of the storage nodes in the cluster, for example, to create isolated partitions within the cluster. In one embodiment, an LIF includes an Internet Protocol (IP) address and its associated characteristics. Each SVM may have a separate administrator authentication domain and can be managed independently via a management LIF to allow, among other things, definition and configuration of the associated CGs.

In the context of the present example, the SVMs make use of a configuration database (e.g., replicated database (RDB) 512a and 512b), which may store configuration information for their respective clusters. A configuration database provides cluster wide storage for storage nodes within a cluster. The configuration information may include relationship information specifying the status, direction of data replication, relationships, and/or roles of individual CGs, a set of CGs, members of the CGs, and/or the mediator. A pair of CGs may be said to be "peered" when one is protecting the other. For example, a CG (e.g., CG 515b) to which data is configured to be synchronously replicated may be referred to as being in the role of a destination CG, whereas the CG (e.g., CG 515a) being protected by the destination CG may be referred to as the source CG. Various events (e.g., transient or persistent network connectivity issues, availability/unavailability of the mediator, site failure, and the like) impacting the stretch cluster may result in the relationship information being updated at the cluster and/or the CG level to reflect changed status, relationships, and/or roles.

While in the context of various embodiments described herein, a volume of a CG may be described as performing certain actions (e.g., taking other members of a CG out of synchronization, disallowing/allowing access to the dataset or the mirror copy, issuing consensus protocol requests, etc.), it is to be understood such references are shorthand for an SVM or other controlling entity, managing or containing the volume at issue, performing such actions on behalf of the volume.

While in the context of various examples described herein, data replication may be described as being performed in a synchronous manner between a paired set of CGs associated with different clusters (e.g., from a primary or master cluster to a secondary or slave cluster), data replication may also be performed asynchronously and/or within the same cluster. Similarly, a single remote CG may protect multiple local CGs and/or multiple remote CGs may protect a single local CG. For example, a local CG can be setup for double protection by two remote CGs via fan-out or cascade topologies. In addition, those skilled in the art will appreciate a cross-site high-availability (HA) solution may include more than two clusters, in which a mirrored copy of a dataset of a primary (master) cluster is stored on more than one secondary (slave) cluster.

The various nodes (e.g., storage nodes 136a-n and storage node 200) of the distributed storage systems described herein, and the processing described below with reference to the flow diagrams of FIGS. 7, 9 and 10 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, the processing may be performed by one or more virtual or physical computer systems of various forms, such as the computer system described with reference to FIG. 11 below.

Figure 6A:
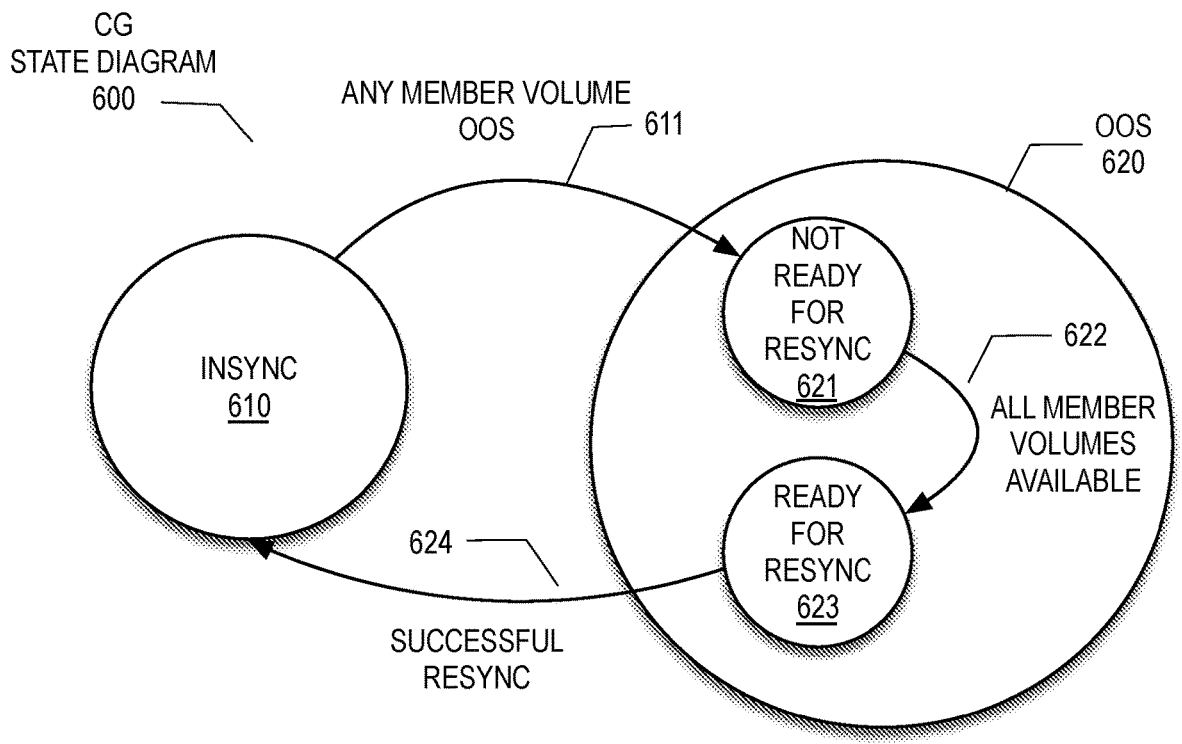
FIG. 6A is a CG state diagram in accordance with an embodiment of the present disclosure.

FIG. 6A is a CG state diagram 600 in accordance with an embodiment of the present disclosure. In the context of the present example, the data replication status of a CG can generally be in either of an InSync state (e.g., InSync 610) or an OOS state (e.g., OOS 620). Within the OOS state, two sub-states are shown, a not ready for resync state 621 and a ready for resync state 623.

While a given CG is in the InSync state, the mirror copy of the primary dataset associated with the member volumes of the given CG may be said to be in-synchronization with the primary dataset and asynchronous data replication or synchronous data replication, as the case may be, are operating as expected. When a given CG is in the OOS state, the mirror copy of the primary dataset associated with the member volumes of the given CG may be said to be out-of-synchronization with the primary dataset and asynchronous data replication or synchronous data replication, as the case may be, are unable to operate as expected. Information regarding the current state of the data replication status of a CG may be maintained in a configuration database (e.g., RDB 512a or 512b).

As noted above, in various embodiments described herein, the members (e.g., volumes) of a CG are managed as a single unit. In the context of the present example, the data replication status of a given CG is dependent upon the data replication status of the individual member volumes of the CG. A given CG may transition 611 from the InSync state to the not ready for resync state 621 of the OOS state responsive to any member volume of the CG becoming OOS with respect to a peer volume with which the member volume is peered. A given CG may transition 622 from the not ready for resync state 621 to the ready for resync state 623 responsive to all member volumes being available. In order to support recovery from, among other potential disruptive events, manual planned disruptive events (e.g., balancing of CG members across a cluster) a resynchronization process is provided to promptly bring the CG back into the InSync state from the OOS state. Responsive to a successful CG resync, a given CG may transition 624 from the ready for resync state 623 to the InSync state. A non-limiting example of a CG resynchronization process is described below with reference to FIG. 7.

Although outside the scope of the present disclosure, for completeness it is noted that additional state transitions may exist. For example, in some embodiments, a given CG may transition from the ready for resync state 623 to the not ready for resync state 621 responsive to unavailability of a mediator (e.g., mediator 120) configured for the given CG. In such an embodiment, the transition 622 from the not ready for resync state 621 to the ready for resync state 623 should additionally be based on the communication status of the mediator being available.

Figure 6B:
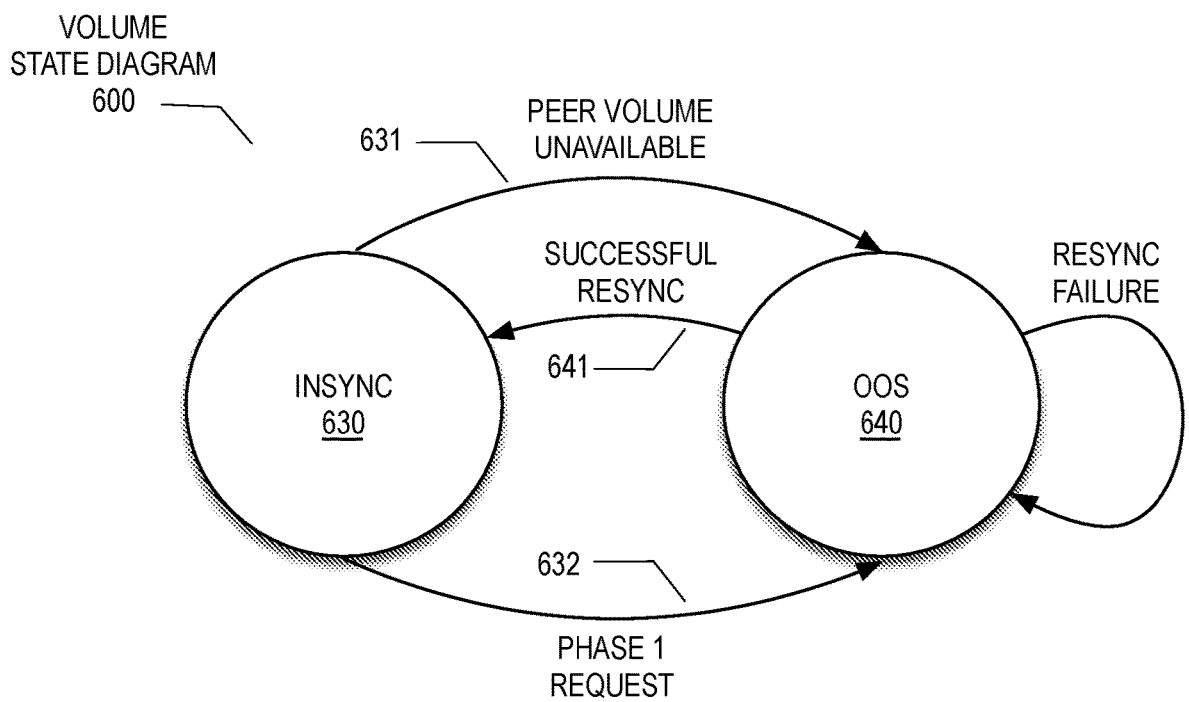
FIG. 6B is a volume state diagram in accordance with an embodiment of the present disclosure.

FIG. 6B is a volume state diagram 650 in accordance with an embodiment of the present disclosure. In the context of the present example, the data replication status of a volume can be in either of an InSync state (e.g., InSync 630) or an OOS state (e.g., OOS 640). While a given volume of a local CG (e.g., CG 515a) is in the InSync state, the given volume may be said to be in-synchronization with a peer volume of a remote CG (e.g., CG 515b) and the given volume and the peer volume are able to communicate with each other via the potentially unreliable network (e.g., network 205), for example, through their respective LIFs. When a given volume of the local CG is in the OOS state, the given volume may be said to be out-of-synchronization with the peer volume of the remote CG and the given volume and the peer volume are unable to communicate with each other. According to one embodiment, a periodic health check task may continuously monitor the ability to communicate between a pair of peered volumes. Information regarding the current state of the data replication status of a volume may be maintained in a configuration database (e.g., RDB 512a or 512b).

A given volume may transition 631 from the InSync state to the OOS state responsive to a peer volume being unavailable. A given volume may transition 64 from the OOS state to the InSync state responsive to a successful resynchronization with the peer volume. As described below in further detail, in one embodiment, dependent write-order consistency of the mirror copy is preserved by responsive to any member volume of a given CG detecting it has gone OOS for any reason (e.g., a network failure), driving all member volumes OOS. In the context of the present example, a given volume may transition 632 from the InSync state to the OOS state responsive to receipt of a phase 1 request of a three-way handshake of a consensus protocol request. For example, as described further below with reference to FIG. 8, transitioning to the OOS state during an intermediate stage of a consensus protocol request, represents an optimization that allows a single consensus protocol request to drive the given CG OOS rather than requiring the use of multiple consensus protocol requests.

CG Resynchronization

Figure 7:
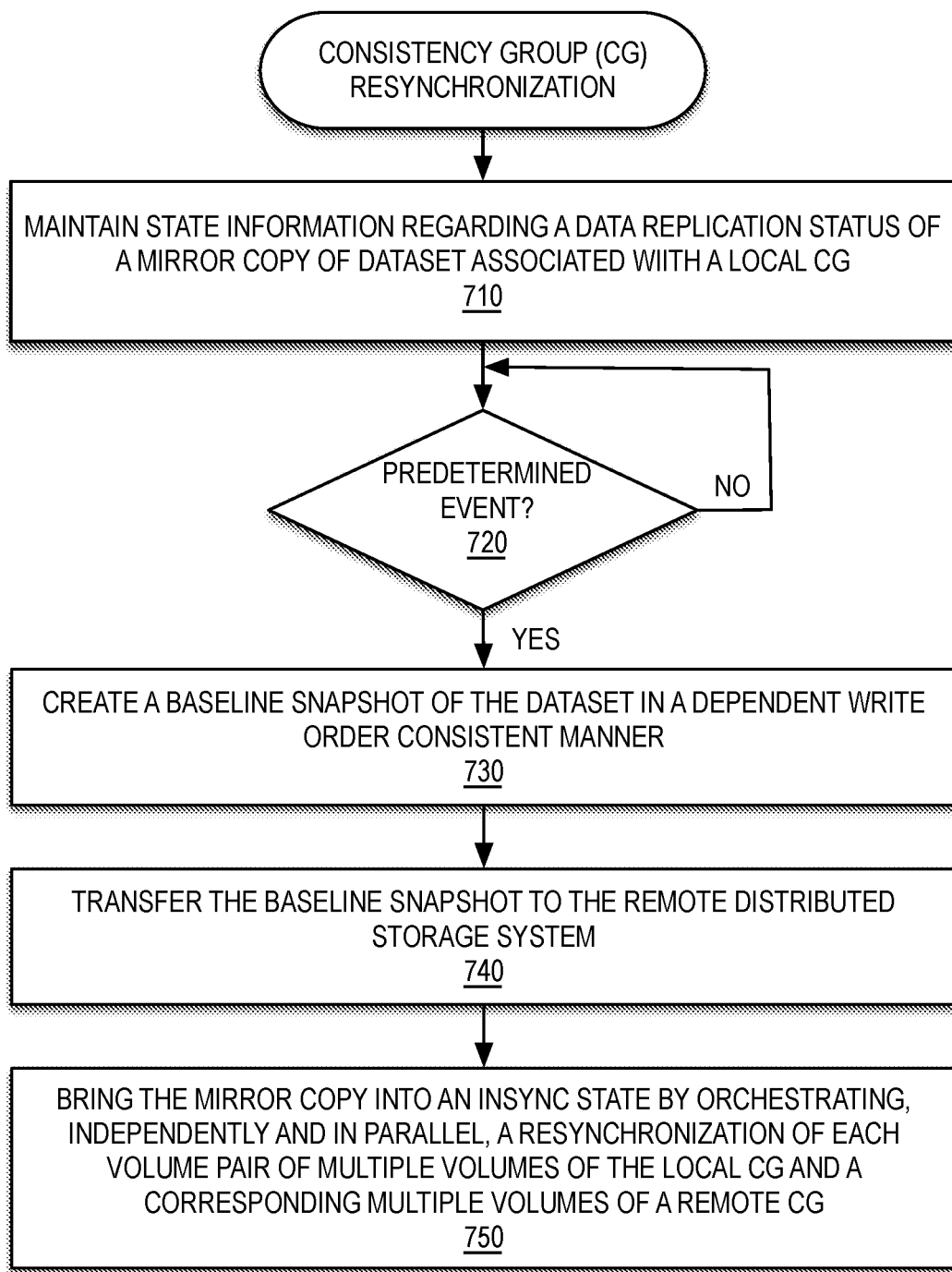
FIG. 7 is a flow diagram illustrating a set of operations for performing CG resynchronization in accordance with an embodiment of the present disclosure.

FIG. 7 is a flow diagram illustrating a set of operations for performing CG resynchronization in accordance with an embodiment of the present disclosure. In the context of the present example, it is assumed a peered pair of CGs, including a local CG (e.g., CG 515a) of a distributed storage system (e.g., cluster 510a) and a remote CG (e.g., CG 515b), has been in an OOS state (e.g., OOS 620) for a period of time, meaning the mirror copy hosted by the member volumes of the remote CG is out-of-synchronization with respect to the primary dataset hosted by the member volumes of the local CG. Depending upon the nature of the data replication being performed (e.g., asynchronous or synchronous) and the particular implementation, a CG resynchronization may be performed responsive to a predetermined event to bring the CG back into an InSync state (e.g., InSync 610).

At block 710, state information regarding a data replication status of a mirror copy of a dataset associated with a local CG may be maintained, for example, to facilitate automatic triggering of CG resynchronization. For example, the state information may include information relating to the current availability or unavailability of a peer volume of a remote CG corresponding to a member volume of the local CG and/or the data replication state of the local CG. In one embodiment, the state information may track the current state of a given CG and a given volume consistent with the state diagrams of FIG. 6A and FIG. 6B.

At decision block 720, it is determined whether a predetermined event has occurred. If so, then processing continues with bock 730; otherwise, processing loops back to decision block 720. According to one embodiment, the predetermined event represents all peer volumes of a remote CG corresponding to the member volumes of the local CG being available (e.g., reachable via communications via a network coupling the distributed storage system with the remote distributed storage system). In alternative embodiments, CG resynchronization may be triggered by other means, for example, via a command issued by an administrative user of the cross-site storage solution of which the distributed storage system and the remote distributed storage system are a part). Also, a change in network availability from unavailable to available may trigger resynchronization. For example, a network subsystem may notify the subsystem responsible for performing resynchronization regarding network availability for a particular peer cluster and based on that resynchronization subsystem can trigger resynchronization for any configured CG relationships that are flagged as OOS.

At block 730, a baseline snapshot (which may also be referred to as a consistent view snapshot) of the dataset is created in a dependent write-order consistent manner According to one embodiment, the baseline snapshot is created at the local CG an asynchronous transfer (e.g., block 740) is subsequently performed to transfer the content to the remote CG, while allowing operations to continue on the member volumes of the local CG. The baseline snapshot may be created by pausing I/O to all member volumes of the local CG, creating the baseline snapshot for all member volumes, and then unpausing the I/Os.

At block 740, the baseline snapshot is transferred to the remote distributed storage system.

At block 750, the mirror copy is brought into an InSync state by orchestrating, independently and in parallel, a resynchronization of each volume pair of member volumes of the local CG and the corresponding member volumes of the remote CG. Advantageously, this independent and parallel resynchronization approach contributes to scalability of CGs by supporting CGs with a large number of member volumes without requiring a change to the resynchronization process.

According to one embodiment, while the resynchronization process remains incomplete, the access to the mirror copy may allowed, but only to a last known CG consistent point. For example, a baseline snapshot once transferred (e.g., at block 740) becomes the last known CG consistent point.

According to one embodiment, within a particular CG one volume may be considered the monarch volume. The node within the cross-site storage solution that hosts the monarch volume may be considered the monarch node. The monarch node may orchestrate the resynchronization of each individual member volume. During the resynchronization process, the monarch node may ensure no write-order inconsistent view is provided on the mirror copy, even if certain member volumes achieve the InSync state prior to the others. After all the member volumes have achieved the InSync state, the monarch node may allow the application associated with the CG to view and/or access the InSync mirror copy on the remote location, which is guaranteed to be write-order consistent.

For purposes of clarifying the difference between a master node and a monarch node, in various embodiments described herein, there is one master node per distributed storage system and one monarch node per CG.

While in the context of the present example, more individual parallel transfers of data may be involved as a result of performing the resynchronization independently on a volume-by-volume basis, advantageously, a failure during the resynchronization of one member volume of the CG will not affect the ability of any of the other member volumes to come to the steady state of InSync. In this manner, when a restart of the resynchronization process is performed due to such a failure, the subsequent resynchronization may exclude those member volumes that are already in the InSync state and need only be retried for those that remain in the 00S state. Another perceived advantage of the CG resynchronization approach described above is the limited number of coordination points, including creation of the consistent view snapshot and bringing all the member volumes into the InSync state. As such, the CG resynchronization process is expected to be faster and involve fewer error scenarios than alternative approaches.

Preservation of Dependent Write-Order Consistency

In accordance with various embodiments, as a CG represents a distributed object within a cross-site storage solution, efforts are undertaken to ensure dependent write-order consistency of the mirror copy. For example, responsive to any member volume of a CG becoming out-of-synchronization (OOS) with respect to a peer volume, the CG as a whole is taken OOS to preserve dependent write-order consistency of the mirror copy.

Figure 8:
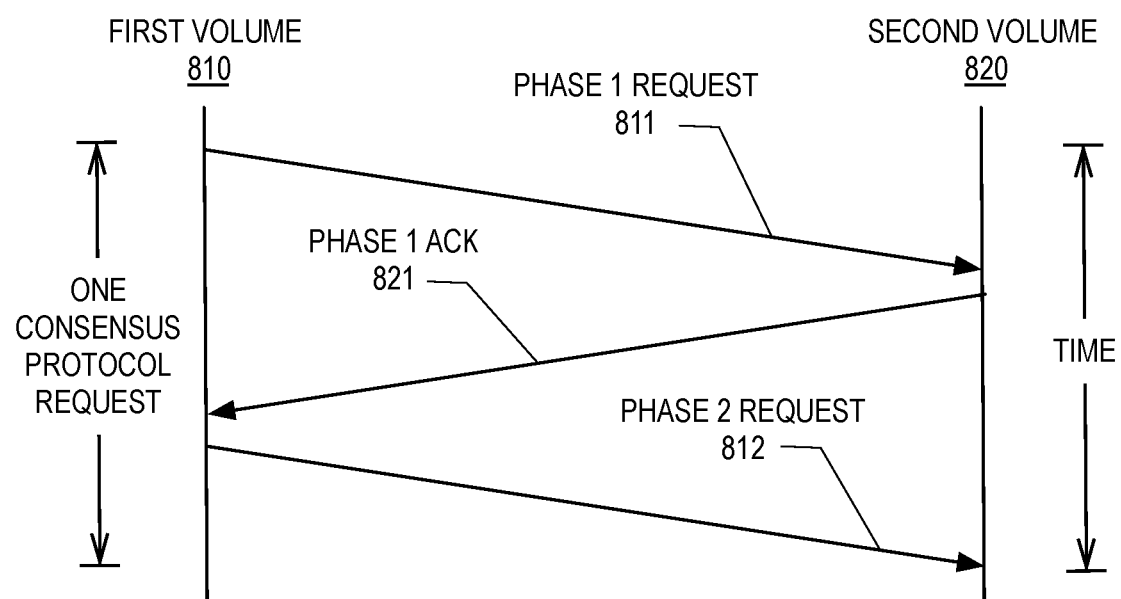
FIG. 8 is a simplified message sequence diagram illustrating the use of a single consensus protocol request to preserve dependent write-order consistency by taking a CG out-of-synchronization (OOS) in accordance with an embodiment of the present disclosure.

FIG. 8 is a simplified message sequence diagram illustrating the use of a single consensus protocol request to preserve dependent write-order consistency by taking a CG out-of-synchronization (OOS) in accordance with an embodiment of the present disclosure. Certain optimizations are implemented in various embodiments to reduce the complexity and/or the amount of time to achieve a particular result. The present example seeks to illustrate one such optimization involving the use of one consensus protocol request (e.g., a request issued by an implementation of the Paxos family of protocols for solving consensus) to efficiently place all member volumes into an OOS state (e.g., OOS 640) responsive to any member volume of the CG transitioning into the OOS state. In this manner, replication of data between corresponding pairs of volumes may be temporarily halted to preserve dependent write-order consistency until the CG can be brought back into an InSync state (e.g., InSync 610).

While for simplicity, only two member volumes (e.g., a first volume 810 and a second volume 820) of a CG are described in the context of the present example, it is to be understood that a CG may include more member volumes. In the context of the present example, it is assumed the first volume 810 has become OOS with respect to its peer volume of the remote CG. Responsive to detecting this condition, in one embodiment, a single consensus protocol request is used to cause all other member volumes (in this case, the second volume 820) to transition into the OOS state. A more traditional approach would involve the use of two consensus protocol requests to cause all other member volumes to transition into the OOS state in which the first consensus protocol request would be used to cause each member volume to stop data access to itself and the second consensus protocol request would be used to cause each member volume to take the mirror copy OOS and start allowing local data access.

Rather than following the more traditional approach, in the context of the present example, member volumes are operable to take action responsive to an intermediate stage of the single consensus protocol request so as to reduce I/O disruption and/or the amount of time otherwise required to resume I/O. As shown in FIG. 8, the single consensus protocol request involves a three-way handshake, including a phase 1 request 811 broadcast on behalf of the first volume 810, a phase 1 acknowledgement (ACK) 821 broadcast on behalf of the second volume 820, and a phase 2 request 812 broadcast on behalf of the first volume 810. The phase 1 request 111 may represent a vote request/phase used to confirm each member is available in the group and ready to receive the phase 2 request 812. The phase 1 ACK may be used to acknowledge the vote in favor of receiving the phase 2 request 812. As described further below with reference to FIG. 9, receipt of the phase 1 request 811 may cause each member volume to stop data access to itself and receipt of the phase 2 request 812 may cause each member volume to take the mirror copy OOS and start allowing local data access. As such, I/O disruption that would typically span the time it takes to perform two consensus protocol requests may be reduced by one half by leveraging the phase 1 request 811 (e.g., the vote phase) as one step to start the OOS process by causing the member volumes to stop I/O access.

Figure 9:
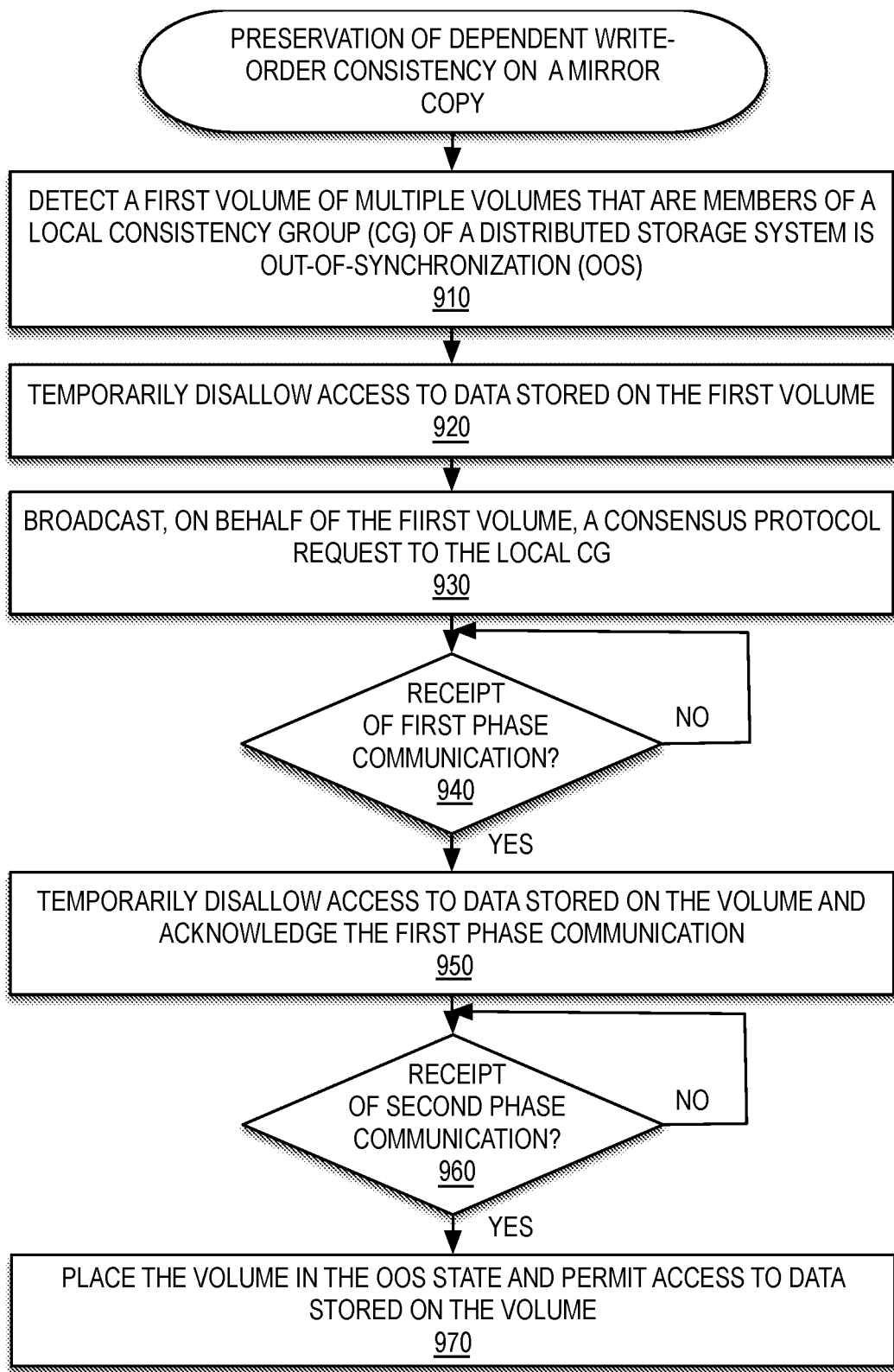
FIG. 9 is a flow diagram illustrating a set of operations for preservation of dependent write-order consistency on a mirror copy in accordance with an embodiment of the present disclosure.

FIG. 9 is a flow diagram illustrating a set of operations for preservation of dependent write-order consistency on a mirror copy in accordance with an embodiment of the present disclosure. At block 910, it is detected that a first volume (e.g., first volume 810) of a local CG (e.g., CG 515*a*) of a distributed storage system (e.g., cluster 510*a*) is in an OOS state (e.g., OOS 640). Responsive to detecting this condition, at block 920, access to data stored on the first volume is temporarily disabled. According to one embodiment, responses to any completed operations may be held until this distributed transaction completes so as prevent any dependent writes from entering any member volume of the local CG. Alternatively, the I/O operations themselves may be held to accomplish the same objective, albeit, with potentially higher latency. An advantage of the former approach over the latter approach is that the processing of I/O operations is allowed to complete with only the corresponding responses being held while the distributed transaction is taking place. Then, once the distributed transaction completes, the held responses may be released resulting in no additional latency.

At block 930, a single consensus protocol request is broadcast to the local CG on behalf of the first volume.

At decision block 940, a given member volume of the local CG determines whether a first phase communication (e.g., the phase 1 request 811) of the consensus protocol request has been received. If so, processing continues with block 950; otherwise, processing loops back to decision block 940.

At block 950, responsive to receipt of the first phase communication on behalf of the given member volume, access to data stored on the given volume is temporarily disallowed and the first phase communication is acknowledged (e.g., the phase 1 ACK 821).

At decision block 960, a given member volume of the local CG determines whether a second phase communication (e.g., the phase 2 request 812) of the consensus protocol request has been received. If so, processing continues with block 970; otherwise, processing loops back to decision block 960.

At block 970, responsive to receipt of the second phase communication on behalf of the given member volume, the given volume is placed into the OOS state and I/O is resumed by permitting local access to data stored on the given volume. In this manner, what would more traditionally be performed with two consensus protocol requests may be accomplished with a single consensus protocol request by leveraging an intermediate phase of the consensus protocol to trigger part of the OOS process.

Creation of a Common Write-Order Consistent Snapshot

Figure 10:
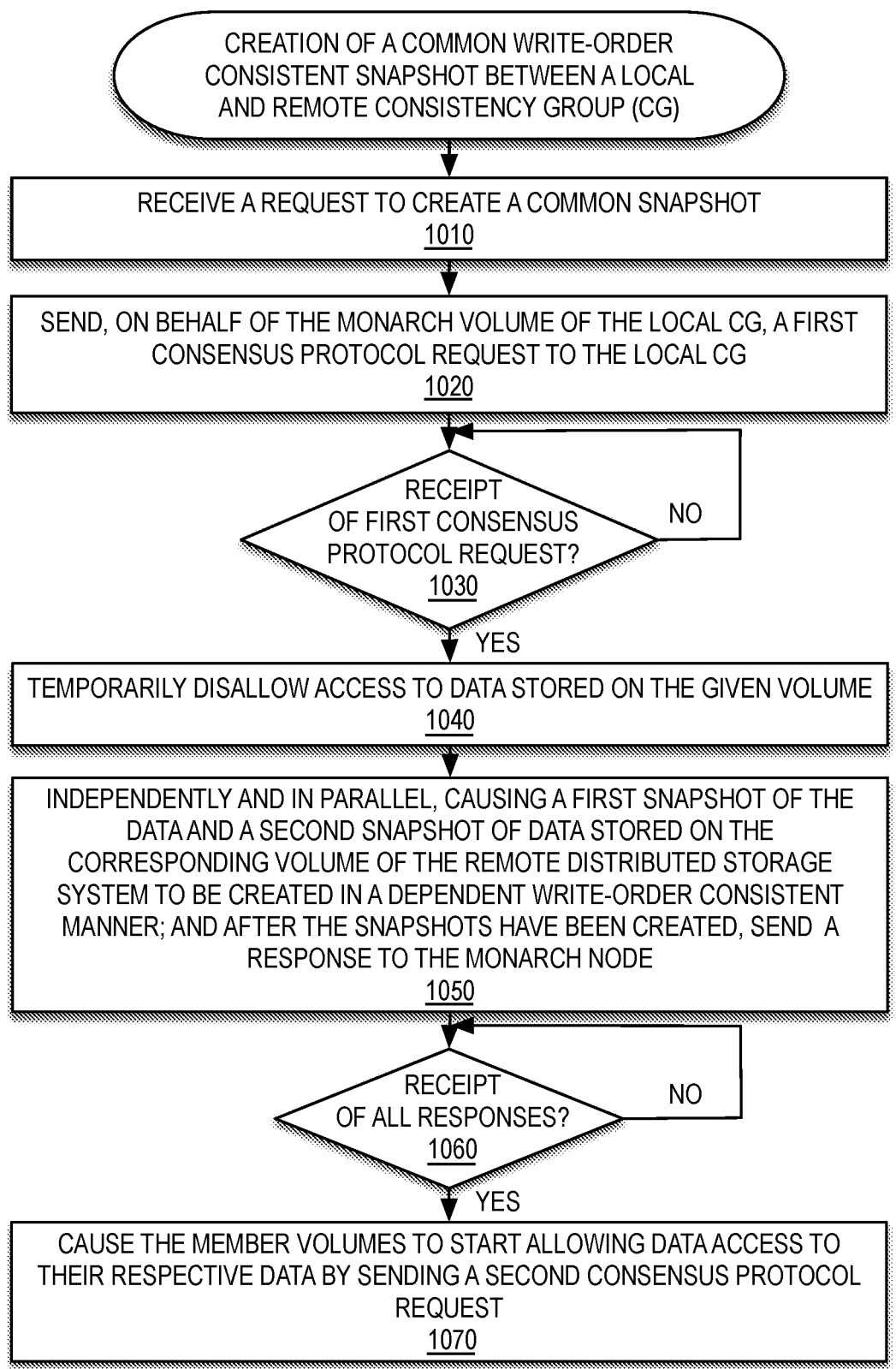
FIG. 10 is a flow diagram illustrating a set of operations for creation of a common write-order consistent snapshot between a local and a remote CG in accordance with an embodiment of the present disclosure.

FIG. 10 is a flow diagram illustrating a set of operations for creation of a common write-order consistent snapshot between a local and a remote CG in accordance with an embodiment of the present disclosure. At block 1010, a request is received to create a common snapshot. The request may be responsive to a request by an application or may be in anticipation of a planned disruptive operation (e.g., moving a volume member or a system upgrade).

At block 1020, a first consensus protocol request is sent on behalf of a first volume of the member volumes of the local CG to the local CG. According to one embodiment, the first volume represents the monarch volume and the node hosting this volume (the monarch node) may orchestrate the process.

At decision block 1030, it is determined whether the first consensus protocol request has been received on behalf of a given member volume of the local CG. If so, processing continues with block 1040; otherwise, processing loops back to decision block 1030.

At block 1040, responsive to receipt of the first consensus protocol request on behalf of a given member volume access to data stored on the given volume is temporarily disallowed.

At block 1050, a first snapshot of the data stored on the given volume and a second snapshot of the data stored on the peer volume of the corresponding remote CG the remote distributed storage system are created independently and in parallel in a dependent write-order consistent manner After the snapshots have been created, the monarch node may be notified by sending a response to the monarch node.

At decision block 1060, it is determined by the monarch node whether all responses have been received. If so, processing continues with block 1070; otherwise processing loops back to decision block 1060.

At decision block 1070, the member volumes are caused by the monarch node to start allowing data access to their respective data by causing a second consensus protocol request to be broadcast to the local CG.

According to one embodiment, an example of an optimization that may be performed as part of the above snapshot creation involves flushing out a file system buffer cache to disk only once on behalf of all member volumes residing in the same aggregate (e.g., set of disks). Consider, for example, a CG with member volumes v1-v10, where v1-v5 are on aggregate #1 (e.g., disk set1) and v6-v10 are on aggregate #2 (e.g., disk set 2). In this situation, creation of a common snapshot involves a snapshot create request being initiated for all member volumes (v1-v10) and the monarch node may be the node orchestrating this distributed process and will return to the caller with a success or failure upon completion of snapshot creation on all 10 member volumes. Continuing with this example, in which there are two aggregates (disk sets) involved in this CG snapshot creation process, this particular optimization would involve only 2 flushes—one for disk sett and another for disk set 2. Alternatively, a sub-optimal implementation would be to flush the file system buffer cache for each volume, which would result in increased load on the system.

While in the context of the example described above it is assumed the common Write-order consistent snapshot is for all member volumes of a particular CG, it is noted that replication of such a snapshot may be performed as a lower level of granularity, for example, including only a partial set of member volumes of the particular CG.

Example Computer System

Embodiments of the present disclosure include various steps, which have been described above. The steps may be performed by hardware components or may be embodied in machine-executable instructions, which may be used to cause a processing resource (e.g., a general-purpose or special-purpose processor) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors within a single computer) and storage systems containing or having network access to computer program(s) coded in accordance with various methods described herein, and the method steps associated with embodiments of the present disclosure may be accomplished by modules, routines, subroutines, or subparts of a computer program product.

Figure 11:
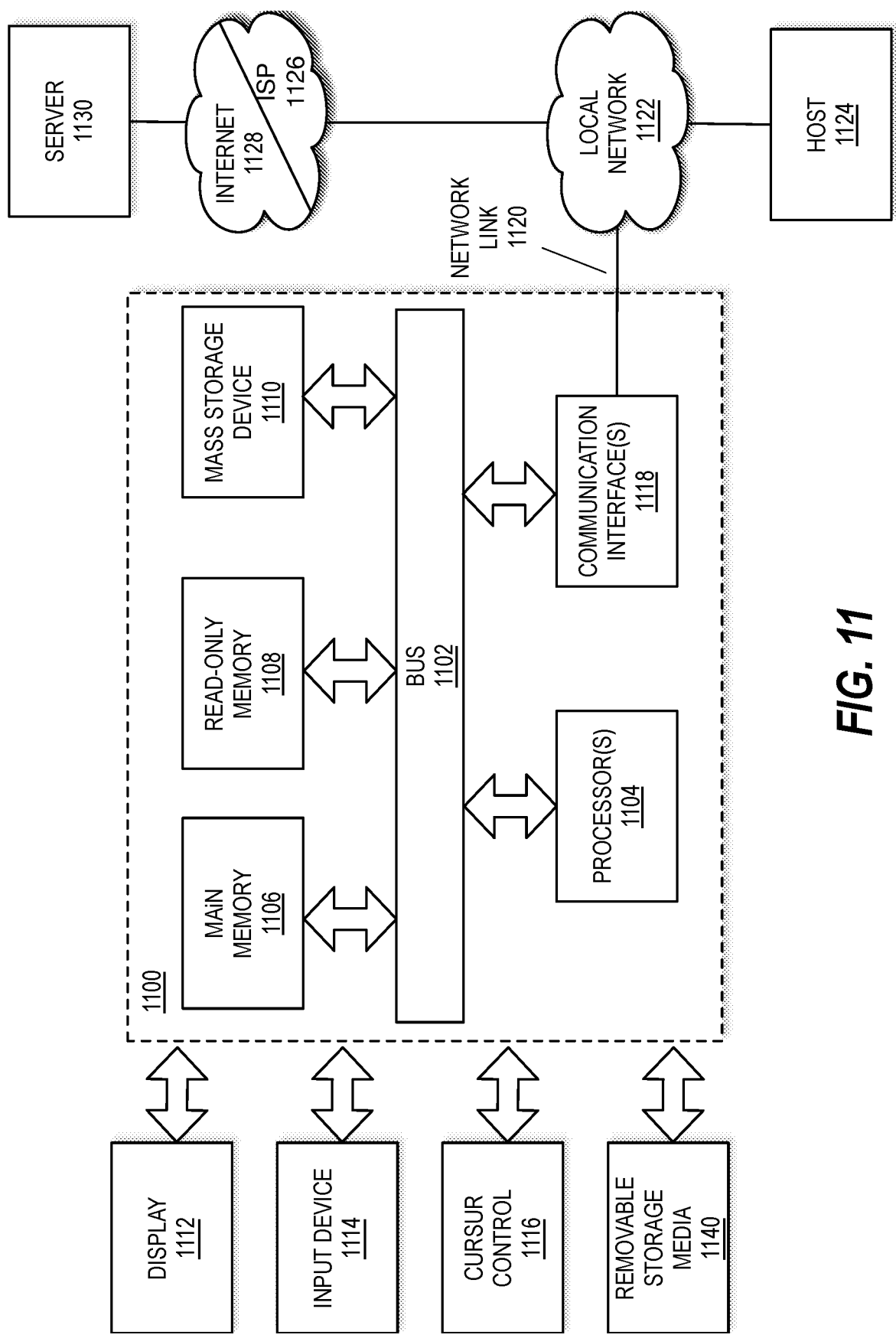
FIG. 11 illustrates an example computer system in which or with which embodiments of the present disclosure may be utilized.

FIG. 11 is a block diagram that illustrates a computer system 1100 in which or with which an embodiment of the present disclosure may be implemented. Computer system 1100 may be representative of all or a portion of the computing resources associated with a node (e.g., storage nodes 136*a-n* or storage nodes 146*a-n*) of a distributed storage system (e.g., cluster 235 or 245) or an administrative workstation (e.g., computer system 110 or 210). Notably, components of computer system 1100 described herein are meant only to exemplify various possibilities. In no way should example computer system 1100 limit the scope of the present disclosure. In the context of the present example, computer system 1100 includes a bus 1102 or other communication mechanism for communicating information, and a processing resource (e.g., a hardware processor 1104) coupled with bus 1102 for processing information. Hardware processor 1104 may be, for example, a general purpose microprocessor.

Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, e.g., a magnetic disk, optical disk or flash disk (made of flash memory chips), is provided and coupled to bus 1102 for storing information and instructions.

Computer system 1100 may be coupled via bus 1102 to a display 1112, e.g., a cathode ray tube (CRT), Liquid Crystal Display (LCD), Organic Light-Emitting Diode Display (OLED), Digital Light Processing Display (DLP) or the like, for displaying information to a computer user. An input device 1114, including alphanumeric and other keys, is coupled to bus 1102 for communicating information and command selections to processor 1104. Another type of user input device is cursor control 1116, such as a mouse, a trackball, a trackpad, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Removable storage media 1140 can be any kind of external storage media, including, but not limited to, hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), USB flash drives and the like.

Computer system 1100 may implement the techniques described herein using customized hard-wired logic, one or more ASICs or FPGAs, firmware or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device 1110. Volatile media includes dynamic memory, such as main memory 1106. Common forms of storage media include, for example, a flexible disk, a hard disk, a solid state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118. The received code may be executed by processor 1104 as it is received, or stored in storage device 1110, or other non-volatile storage for later execution.

What is claimed is:

1. A method performed by one or more processing resources of a distributed storage system, the method comprising:
   maintaining state information regarding a data replication status of a mirror copy of a dataset associated with a local consistency group, wherein the distributed storage system includes a plurality of volumes that are members of the local consistency group and wherein the mirror copy is stored on a corresponding plurality of volumes that are members of a remote consistency group of a remote distributed storage system;
   responsive to a predetermined event, after a period of time during which the state information indicated each volume of each volume pair of a plurality of volume pairs including a volume of the plurality of volumes of the local consistency group and a corresponding volume of the remote consistency group was in an out-of-synchronization (OOS) state, creating a baseline snapshot of the dataset in a dependent write-order consistent manner;
   transferring the baseline snapshot to the remote distributed storage system; and
   bringing the mirror copy into an in-synchronization (In-Sync) state by, for each volume pair of the plurality of volume pairs, orchestrating a resynchronization of the volume pair independent of any other volume pair of the plurality of volume pairs and in parallel with one or more other volume pairs of the plurality of volume pairs.

2. The method of claim 1, wherein the predetermined event comprises an availability of all volumes of the corresponding plurality of volumes.

3. The method of claim 1, wherein the mirror copy is in the InSync state when all volume pairs of the plurality of volume pairs are in the InSync state.

4. The method of claim 1, further comprising:
during performance of the resynchronization, limiting access to the mirror copy to a last known consistent point for the local consistency group and the remote consistency group; and
after all volume pairs of the plurality of volume pairs have transitioned from the OOS state to the InSync state, permitting full access to the mirror copy.

5. The method of claim 1, wherein the last known consistent point for the local consistency group and the remote consistency group comprises the baseline snapshot.

6. The method of claim 1, further comprising responsive to a failure by one of more volume pairs of the plurality of volume pairs to transition from the OOS state to the InSync state after performance of the resynchronization, restarting the resynchronization for only the one or more volume pairs.

7. The method of claim 1, wherein an ability of a particular volume pair of the plurality of volume pairs to achieve the InSync state is unaffected by a failure by another volume of the plurality of volume pairs to achieve the InSync state.

8. A non-transitory computer-readable storage medium embodying a set of instructions, which when executed by one or more processing resources of a distributed storage system, cause the distributed storage system to:
maintain state information regarding a data replication status of a mirror copy of a dataset associated with a local consistency group, wherein the distributed storage system includes a plurality of volumes that are members of the local consistency group and wherein the mirror copy is stored on a corresponding plurality of volumes that are members of a remote consistency group of a remote distributed storage system;
responsive to a predetermined event, after a period of time during which the state information indicated each volume of each volume pair of a plurality of volume pairs including a volume of the plurality of volumes of the local consistency group and a corresponding volume of the remote consistency group was in an out-of-synchronization (OOS) state, create a baseline snapshot of the dataset in a dependent write-order consistent manner;
transfer the baseline snapshot to the remote distributed storage system; and
bring the mirror copy into an in-synchronization (InSync) state by, for each volume pair of the plurality of volume pairs, orchestrating a resynchronization of the volume pair independent of any other volume pair of the plurality of volume pairs and in parallel with one or more other volume pairs of the plurality of volume pairs.

9. The non-transitory computer-readable storage medium of claim 8, wherein the predetermined event comprises an availability of all volumes of the corresponding plurality of volumes.

10. The non-transitory computer-readable storage medium of claim 8, wherein the mirror copy is in the InSync state when all volume pairs of the plurality of volume pairs are in the InSync state.

11. The non-transitory computer-readable storage medium of claim 8, wherein the instructions further cause the distributed storage system to:
during performance of the resynchronization, limit access to the mirror copy to a last known consistent point for the local consistency group and the remote consistency group; and
after all volume pairs of the plurality of volume pairs have transitioned from the OOS state to the InSync state, permit full access to the mirror copy.

12. The non-transitory computer-readable storage medium of claim 8, wherein the last known consistent point for the local consistency group and the remote consistency group comprises the baseline snapshot.

13. The non-transitory computer-readable storage medium of claim 8, wherein the instructions further cause the distributed storage system to responsive to a failure by one of more volume pairs of the plurality of volume pairs to transition from the OOS state to the InSync state after performance of the resynchronization, restart the resynchronization for only the one or more volume pairs.

14. The non-transitory computer-readable storage medium of claim 8, wherein an ability of a particular volume pair of the plurality of volume pairs to achieve the InSync state is unaffected by a failure by another volume of the plurality of volume pairs to achieve the InSync state.

15. A distributed storage system comprising:
one or more processing resources; and
one or more non-transitory computer-readable media, coupled to the one or more processing resources, having stored therein instructions that when executed by the one or more processing resources cause the distributed storage system to:
maintain state information regarding a data replication status of a mirror copy of a dataset associated with a local consistency group, wherein the distributed storage system includes a plurality of volumes that are members of the local consistency group and wherein the mirror copy is stored on a corresponding plurality of volumes that are members of a remote consistency group of a remote distributed storage system;
responsive to a predetermined event, after a period of time during which the state information indicated each volume of each volume pair of a plurality of volume pairs including a volume of the plurality of volumes of the local consistency group and a corresponding volume of the remote consistency group was in an out-of-synchronization (OOS) state, create a baseline snapshot of the dataset in a dependent write-order consistent manner;
transfer the baseline snapshot to the remote distributed storage system; and
bring the mirror copy into an in-synchronization (InSync) state by, for each volume pair of the plurality of volume pairs, orchestrating a resynchronization of the volume pair independent of any other volume pair of the plurality of volume pairs and in parallel with one or more other volume pairs of the plurality of volume pairs.

16. The distributed storage system of claim 15, wherein the predetermined event comprises an availability of all volumes of the corresponding plurality of volumes.

17. The distributed storage system of claim 15, wherein the mirror copy is in the InSync state when all volume pairs of the plurality of volume pairs are in the InSync state.

18. The distributed storage system of claim 15, wherein the instructions further cause the distributed storage system to:

during performance of the resynchronization, limit access to the mirror copy to a last known consistent point for the local consistency group and the remote consistency group; and after all volume pairs of the plurality of volume pairs have transitioned from the OOS state to the InSync state, permit full access to the mirror copy.

19. The distributed storage system of claim 15, wherein the last known consistent point for the local consistency group and the remote consistency group comprises the baseline snapshot.

20. The distributed storage system of claim 15, wherein the instructions further cause the distributed storage system to responsive to a failure by one of more volume pairs of the plurality of volume pairs to transition from the OOS state to the InSync state after performance of the resynchronization, restart the resynchronization for only the one or more volume pairs.

21. The distributed storage system of claim 15, wherein an ability of a particular volume pair of the plurality of volume pairs to achieve the InSync state is unaffected by a failure by another volume of the plurality of volume pairs to achieve the InSync state.

\* \* \* \* \*